(Model.)
E. P. BARRETT.
WHIFFLETREE HOOK.
No. 250,484. Patented Dec. 6, 1881.
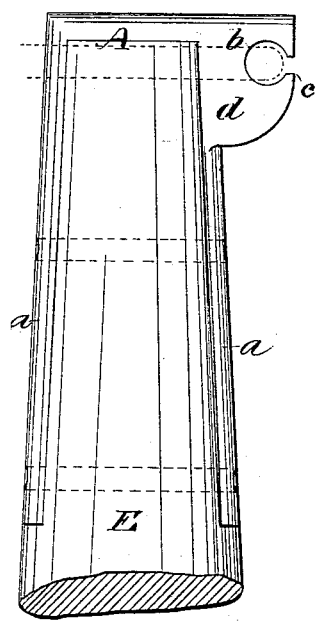
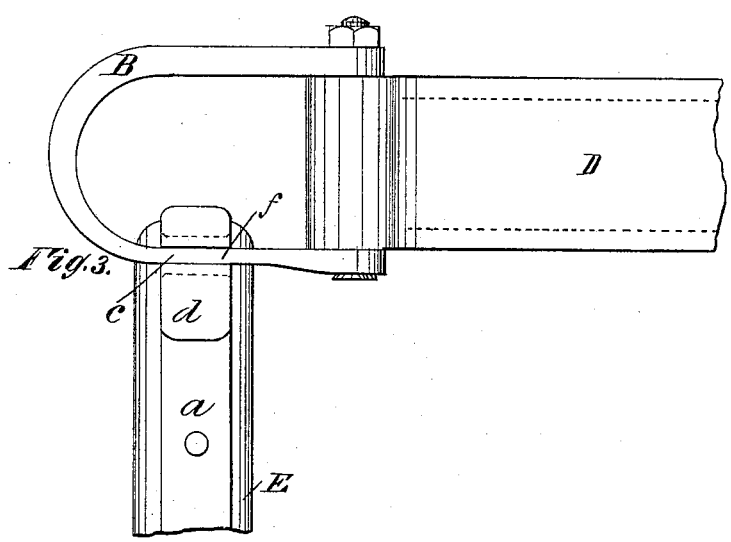
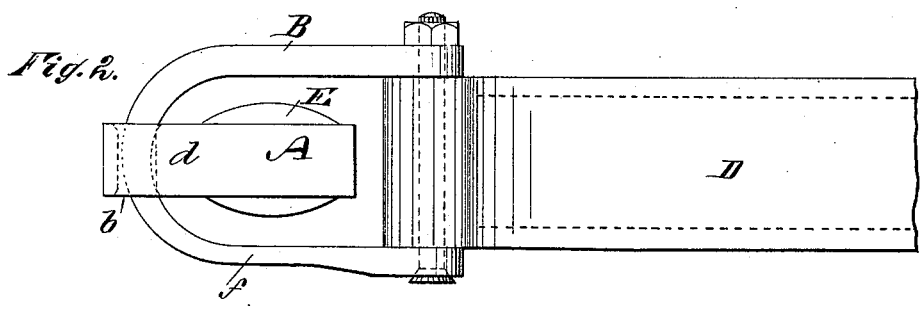
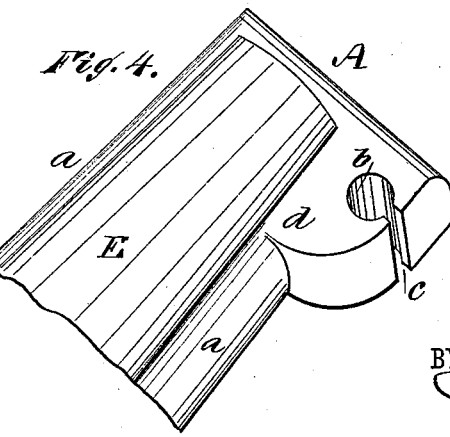
WITNESSES:
Theo. G. Hoster
C. Sedgwick
INVENTOR:
E. P. Barrett
BY Munn & Co.
ATTORNEYS.

UNITED STATES PATENT OFFICE.

EDWARD P. BARRETT, OF HOLDEN, MISSOURI, ASSIGNOR TO HIMSELF AND JOHN A. FOSTER, OF SAME PLACE.

WHIFFLETREE-HOOK.

SPECIFICATION forming part of Letters Patent No. 250,484, dated December 6, 1881.

Application filed August 19, 1881. (Model.)

*To all whom it may concern:*

Be it known that I, E. P. BARRETT, of Holden, Johnson county, Missouri, have invented a new and Improved Cockeye and Single-Tree Clip, of which the following is a specification.

The object of my invention is to provide a cockeye and single-tree clip which will strengthen the single-tree and which will be durable, easily used, and perfectly secure against all danger of casual unhooking of the traces.

My invention consists of a ferrule or binding-iron to be placed upon the single-tree, said iron or ferrule being provided with an enlargement upon the side of the single-tree, which enlargement is made with a narrow open slot, which communicates with a larger hole or opening through the said enlargement, and of a cockeye or loop to be attached to the trace, which loop is flattened or reduced in size at one point, so as to readily pass through the slot, the other parts of the loop being made too large to pass through the slot.

Reference is to be had to the accompanying drawings, forming part of this specification, in which similar letters of reference indicate corresponding parts in all the figures.

Figure 1 is a plan view of my improved single-tree clip. Fig. 2 is an end elevation of the single-tree clip and cockeye. Fig. 3 is a plan view, showing the position into which the cockeye has to be brought for unhooking the same; and Fig. 4 is a perspective view of one end of the single-tree having my improved binding-iron or ferrule attached.

A represents the binding-iron, which is formed with the arms *a a* and with the enlarged portion or extension *d*, which extension or enlarged portion is formed with the open vertical slot *c*, which communicates with the circular hole or opening *b*, formed in the said extension; and B represents the cockeye or loop, the greater portion of which is of a size in cross-section about equal to the size of the opening *b*, but is formed at any one point with the flattened or reduced portion *f*, of such size as to readily pass through the slot *c* when the cockeye or loop is brought to the proper position, as shown in Fig. 3.

The cockeye or loop is preferably attached to the end of the trace D, so that the flattened portion *f* thereof will, when the trace is hooked, be down or on the lower side of the loop, as shown in Fig. 2.

The binding-iron is adapted to be fitted upon the end of the single-tree E, so that the enlarged portion *d* will come in rear thereof, as shown in Fig. 2, so that the draw will be in the direction of the greatest strength.

Instead of forming the binding-iron A with the arms *a a*, the same may be in the form of a case or ferrule, to entirely encircle or inclose the end of the single-tree.

By this construction the end of the single-tree is bound and strengthened in the line of the draft, and there will be no danger of accidental unhooking of the trace, as the flattened part of the cockeye cannot of its own accord gain the position necessary for its passage through the slot.

I am aware that it is not new to provide a whiffletree with a ferrule having a loop with a narrow opening at one end to adapt it to receive the trace-hook, which is depressed or made smaller at some point; but it is objectionable for the reason that the draft is upon the hook itself, and it is therefore liable to be broken.

What I claim, and desire to secure by Letters Patent, is—

The combination, with the single-tree E, of the binding-iron A, provided with the arms *a a* and the extension *d*, having the circular opening *b*, and the vertical slot *c*, the said iron being fitted on the end of the single-tree, with its extension in the rear thereof, substantially as and for the purpose set forth.

EDWARD P. BARRETT.

Witnesses:
WM. STEELE,
Z. T. MILLER.